Sept. 18, 1923.
C. RUSSO
VEGETABLE CUTTER
Filed May 25, 1923   3 Sheets-Sheet 1
1,468,546
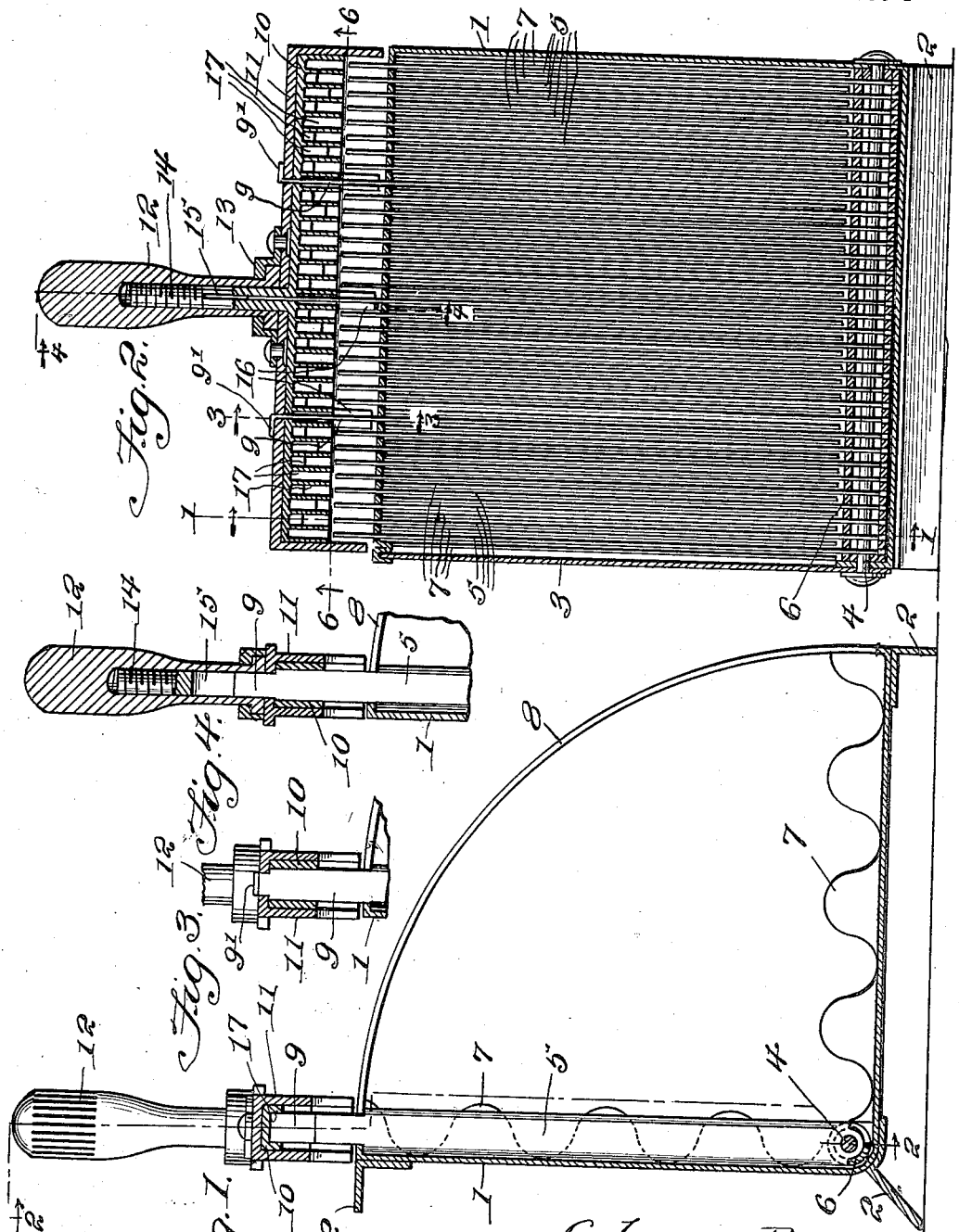
Calogero Russo
INVENTOR
BY Victor J. Evans
ATTORNEY
WITNESS:

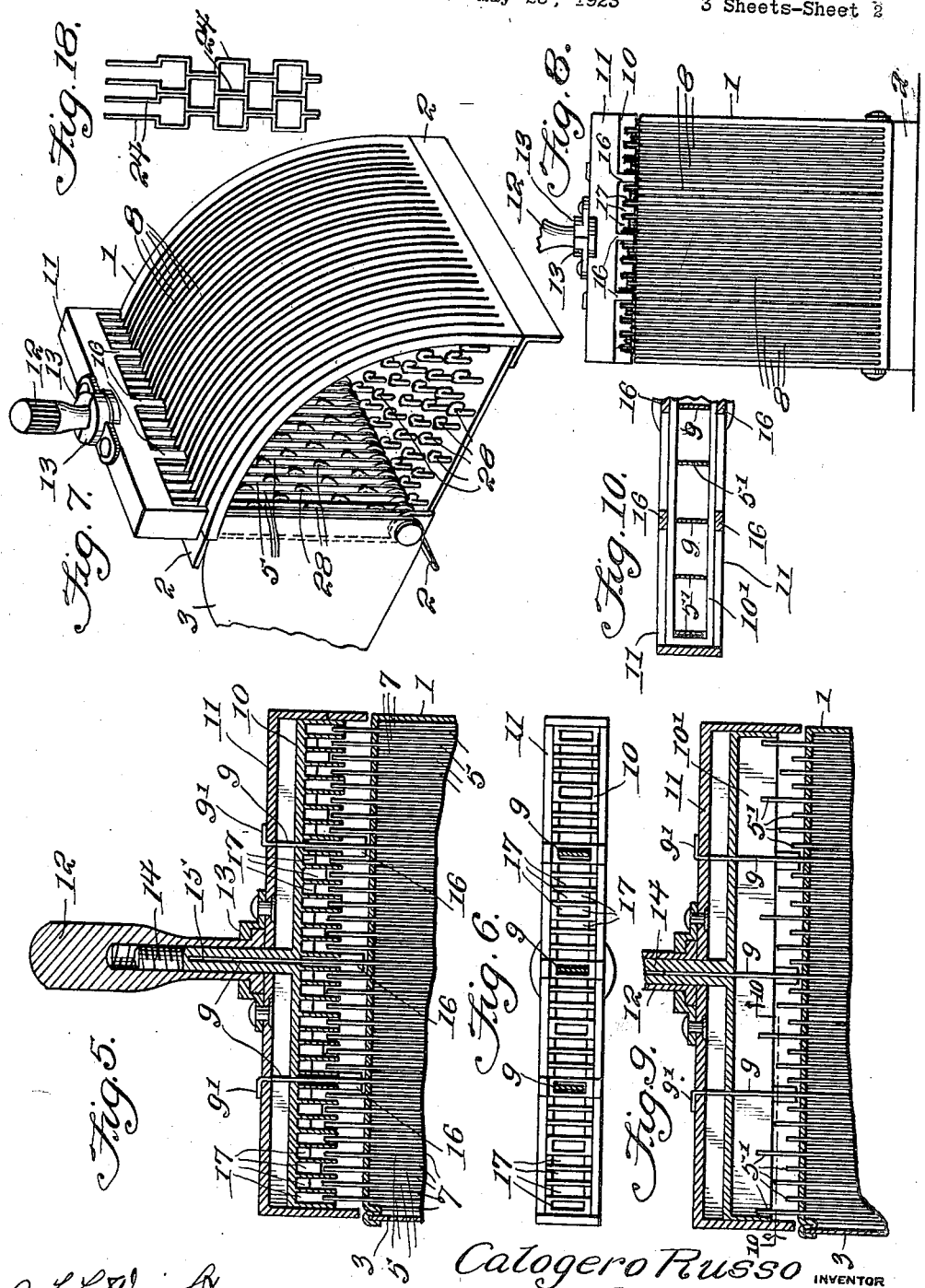

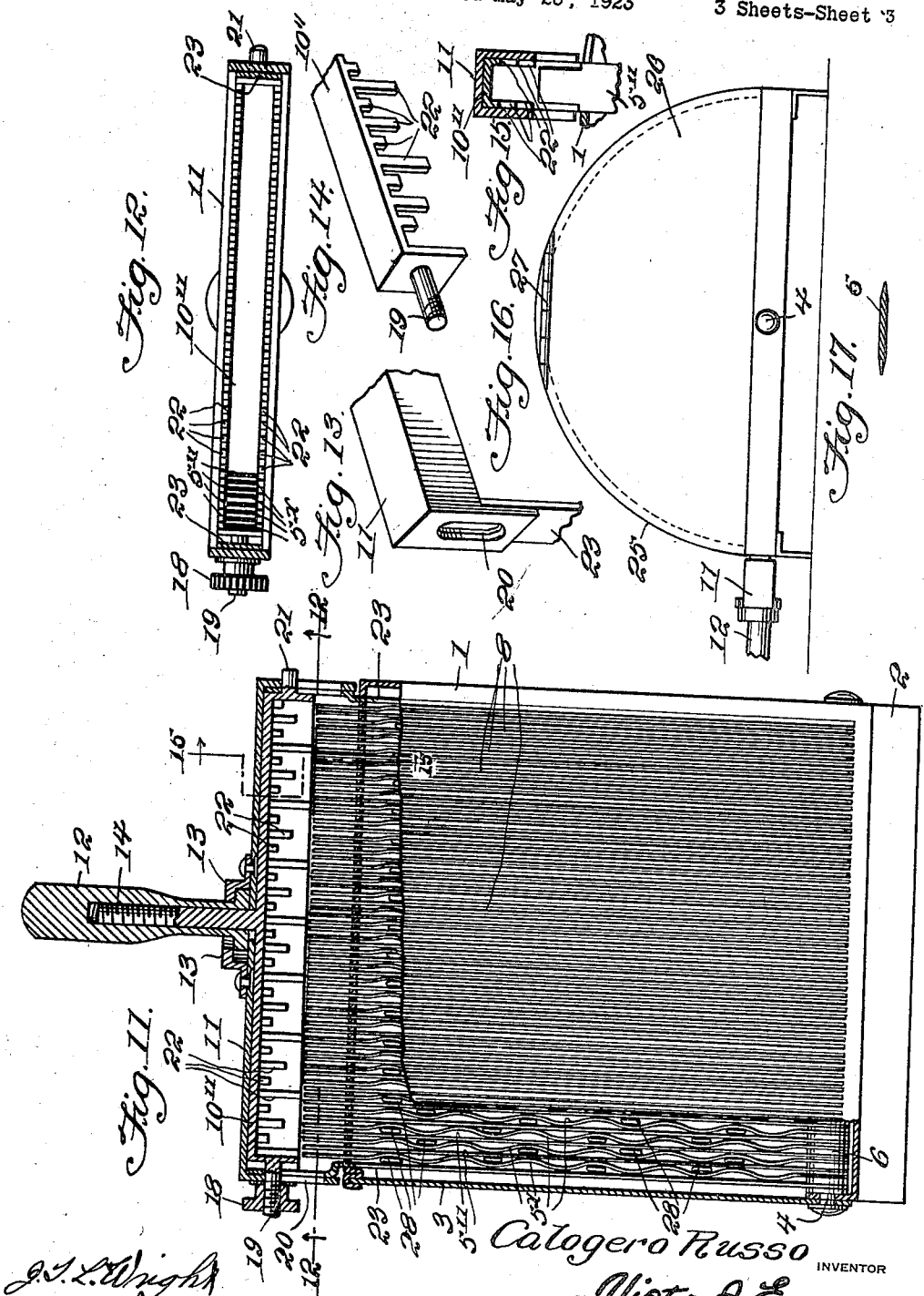

Patented Sept. 18, 1923.

1,468,546

UNITED STATES PATENT OFFICE.

CALOGERO RUSSO, OF CLEVELAND, OHIO.

VEGETABLE CUTTER.

Application filed May 25, 1923. Serial No. 641,456.

*To all whom it may concern:*

Be it known that I, CALOGERO RUSSO, a subject of the King of Italy, residing at Cleveland, in the county of Cuyahoga and State of Ohio, have invented new and useful Improvements in Vegetable Cutters, of which the following is a specification.

This invention relates to a vegetable cutter, the general object of the invention being to provide a plurality of knives for cutting the vegetables into small pieces with means for connecting all the knives or certain groups or sets of knives to an actuating member so that the vegetables can be cut into particles of various sizes as desired.

Another object of the invention is to provide two sets of knives, one set being of different shape than the other set with means for connecting all of the knives of one set or certain numbers of such knives to the actuating member.

Another object of the invention is to so arrange the parts that the knives can be made to cut the vegetables on both the forward and rearward movement so that it is not necessary to return the knives to their starting point in order to cut a second vegetable or number of vegetables.

A further object of the invention is to locate the surfaces for supporting the articles to be cut above the limit of movement of the knives so as to permit the knives to pass entirely through the articles and also to facilitate cleaning of such surfaces.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a section on line 1—1 of Figure 2.

Figure 2 is a section on line 2—2 of Figure 1.

Figure 3 is a section on line 3—3 of Figure 2.

Figure 4 is a section on line 4—4 of Figure 2.

Figure 5 is a view similar to Figure 2, but showing the parts in a different position.

Figure 6 is a section on line 6—6 of Figure 2.

Figure 7 is a perspective view.

Figure 8 is a front view showing the parts arranged to actuate all the knives.

Figure 9 is a view of a modification.

Figure 10 is a section on line 10—10 of Figure 9.

Figure 11 is a view of another modification, parts being shown in section and parts in elevation.

Figure 12 is a section on line 12—12 of Figure 11.

Figure 13 is a fragmentary perspective view of the member to which the handle is attached.

Figure 14 is a similar view of the inner member which engages the knives.

Figure 15 is a section on line 15—15 of Figure 11.

Figure 16 is a view of a modified form of the device.

Figure 17 is a transverse sectional view of one of the knives.

Figure 18 is a view showing another form of knife which may be used with the device.

In these views 1 indicates a casing which is the shape of a quarter of a circle and has the supports 2 upon its flat faces so that either one of the flat faces can be used as a base. The casing is closed at one end and has a sliding cover 3 at its other end, this cover being pivoted to the casing by means of a long bolt 4 which passes through the rear bottom corner of the case. A plurality of knives 5 are threaded on this bolt or shaft 4 and the knives are spaced apart by a tube 6 which has three quarter slots therein to receive the knives. The ends of the slots form stops for holding the knives in either a vertical or horizontal position. The slots are so formed that the knives make a snug fit therein and the walls of the slots frictionally engage the knives and hold them in their adjusted position. Corrugated strips 7 are placed on the flat faces of the casing and are spaced apart to receive the knives between them. The corrugations are of greater depth than the width of the knives so that they will extend above the knives and thus form a support for the articles to be cut which will permit the knives to pass entirely through the articles before the knives come to rest. The rounded side of the casing is provided with a plurality of slots 8 through which the reduced upper ends of the knives extend. Three of the knives are provided with the extensions 9 and these extensions pass through an inner trough-shaped member 10 and an outer trough-shaped member 11 with the ends of the outer extensions bent over, as at 9', to hold the outer extension in position. A handle 12 is rotatably connected with the outer member by means of the bracket 13 and said handle has a threaded socket to receive the threaded stem 14 of the inner member so that by rotating the handle the inner member is moved in the outer member towards and away from the ends of the knives. The extended end of the central knife extends into the slots 15 formed in the stem 14. The outer member is provided with extensions 16 at its sides which are of the same length as the ends of the member so as to form guides for the inner member. The inner member is provided with a plurality of sockets 17, one for each knife. The front and rear walls of these sockets are made of varying lengths so that by adjusting the inner member all the knives will be engaged by the sockets so as to be moved when the handle is swung to the right or left or the inner member can be adjusted so that only certain knives will be engaged by the sockets, these knives being actuated by the handle, and the other knives remain stationary. When the inner member is in its raised position only the three knives which are provided with the extensions 9 will be actuated when the handle is moved to the right or left. It will thus be seen that by this arrangement of parts the articles can be cut to almost any size desired. For instance, when the vegetable is to be cut into large pieces the inner member is raised to its full height so that only three knives will be actuated and thus the article will be cut into four pieces. By partly lowering the inner member the full length sockets will engage their knives so that the article will be cut into a greater number of pieces. By moving the inner member to a lower position other sets of knives will be brought into action and by moving the inner member to its lowest position all the knives will be brought into action.

The article or articles to be cut are placed in the casing, then the door 3 is closed and the handle swung over to horizontal position, after first moving the inner member to engage the number of knives desired. The door is then opened and the cut material dumped from the casing and then other articles can be placed in the casing and the knives returned to their normal position so as to cut these articles. The casing is turned over upon its other flat side so that the new articles will rest upon the corrugated strips on this face of the casing. In this way there is no loss of motion of the knives.

Figure 2 shows the inner member in fully raised position so that three knives will be actuated when the handle is moved. Figure 5 shows the inner member partly lowered so that every fourth blade or knife will be actuated by the movement of the handle. Figure 8 shows the inner member in its lowest position so that all the knives or blades will be actuated by the movement of the handle.

In the form of the invention shown in Figures 9 and 10 the upper ends of the blades are made of different lengths, as shown at 5', instead of providing sockets of different lengths in the inner member. The front and rear walls of this inner member 10' are of the same length so that as it is adjusted downwardly by the handle it will first engage the long blades and then the intermediate blades and finally the short blades. In other respects this form of the invention is similar to that before described.

In the modification shown in Figures 11, 12, 13, 14 and 15 I provide two sets of blades, one set shown at 5", being of straight formation and the other set, shown at $5^x$ being of waved form. The blades of this latter set are arranged between the blades of the first set and in order to permit the inner member 10" to engage the blades of both sets it is arranged to have longitudinal movement in the outer member by means of the nut 18 engaging a threaded stud 19 which is secured to one end of the inner member and which projects through a slot 20 in the outer member. A stud 21 is secured to the other end of the inner member and extends through a similar slot in the other end of the outer member. In this way the inner member can have longitudinal movement as well as movement towards and away from the top of the outer member. The sockets are formed by front and rear projections 22 which are of different lengths so as to enable the inner member to engage different numbers of the blades of each set. By adjusting the inner member longitudinally the projections can be made to engage the blades of either set and by moving it vertically it can be made to engage the desired number of blades of the set. In this form of the invention the outer member is connected with the side pieces 23 which have their lower ends pivoted to the bolt or shaft 4, these side pieces passing through slots in the casing.

The blades have both edges beveled so that they will cut on both the forward and rearward stroke, as shown in Figure 17, and I may use various forms of blades in the device. For instance, I may use blades such as shown at 24 in Figure 18 for cutting the material into strips, it being understood that I do not wish to be limited to any particular form of blade. I may also form the casing of semi-cylindrical form, as shown at 25 in Figure 16. In this form the knives would move in a half circle and the supporting surfaces for the articles would be cut to be at the bottom of the casing. The door 26 would be hinged at its top, as shown at 27.

Instead of making the supporting surfaces for the articles to be cut of corrugated form I may make the base flat and place pins 28 thereon for supporting the articles, the knives passing between the pins. This form is shown in Figure 7.

From the foregoing it will be seen that the device is easily adjustable to bring various sets of knives into actuation so that the article can be cut into almost any size desired. The knives will cut articles on both strokes so that lost movement is avoided. By making the inner member adjustable in two ways two sets of knives can be placed in the device with means for bringing the desired number of knives of each set into actuation. The inner member is easily and quickly adjustable by turning the handle and the said handle is used for actuating the knives.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A cutter of the class described comprising a support, a plurality of knives movably connected with the support, a handle and adjustable means for connecting the handle with all the knives or with different numbers of knives as desired.

2. A cutter of the class described comprising a support, a number of different sets of knives movably connected therewith, a handle and means for connecting the handle with all the knives of either set or with different numbers of such knives.

3. A cutter of the class described comprising a casing, a plurality of knives pivoted therein, a handle for actuating the knives, a member, means for adjusting the member by a rotary movement of the handle and means carried by the member for connecting it with all the knives or with different numbers of such knives.

4. A cutter of the class described comprising a casing, a number of sets of knives pivotally mounted in the casing, the knives of one set being of different shape from those of the other, a handle, a guiding member connected therewith, a member movable in the guiding member, means for adjusting the movable member by a turning movement of the handle, means for adjusting the movable member longitudinally to place it over the different sets of knives and means carried by the member for engaging different numbers of each set of knives when it is adjusted by the handle.

5. A cutter of the class described comprising a casing having a plurality of slots therein, a plurality of knives pivotally mounted in the casing and having their ends extending through the slots, supports in the casing for the articles to be cut, the supports being arranged to permit the knives to pass between them, a guiding member, a handle rotatably mounted thereon, a socketed member within the guiding member, the sockets being of different depths for engaging either of the knives or different numbers of the knives and means for adjusting the member by the rotary movement of the handle.

6. A cutter of the class described comprising a casing having a plurality of slots therein, a shaft carried by the casing, a plurality of knives pivoted to the shafts and having their ends passing through the slots, a channel-shaped member connected with some of the knives, a handle rotatably connected with the channel-shaped member, a socketed member within the channel-shaped member and having its sockets of different lengths for engaging different knives and means for adjusting the socketed member by the rotary movement of the handle.

7. A cutter of the class described comprising a casing having a plurality of slots therein, a shaft carried by the casing, a plurality of knives pivoted to the shafts and having their ends passing through the slots, a channel-shaped member connected with some of the knives, a handle rotatably connected with the channel-shaped member, a socketed member within the channel-shaped member and having its sockets of different lengths for engaging different knives, means for adjusting the socketed member by the rotary movement of the handle, such means consisting of a screw threaded stem on the member and a screw threaded socket in the handle.

8. A cutter of the class described comprising a casing, a plurality of knives pivotally mounted therein, a channel-shaped member, a handle rotatably connected therewith, a socketed member in the channel member, the sockets being of different lengths for engaging different knives, means for adjusting the socketed member by the rotary movement of the handle and means for moving the socketed member longitudinally to place it over different sets of knives, such means consisting of a threaded stud passing through a slot in the channel member and a nut engaging the stud.

9. A cutter of the character described comprising a casing of quarter circle formation, and having its rounded side provided with a plurality of slots terminating adjacent each end thereof, supports projecting from the corners of the flat faces of the casing whereby either of the flat faces may be used for a base, double edged knives operating in the slots and being secured in the rear bottom corner of the casing as and for the purpose specified.

In testimony whereof I affix my signature.

CALOGERO RUSSO.